United States Patent [19]
Santhuff

[11] Patent Number: 5,938,247
[45] Date of Patent: Aug. 17, 1999

[54] COMBINED SHOCK ABSORBER—TORSION BAR TO INCREASE PROPORTION OF SPRUNG TO UNSPRUNG WEIGHT IN REAR OF SUSPENSION DRAGSTER

[76] Inventor: Ronnie L. Santhuff, Rte. 2, Box 67C, Sinton, Tex. 78387

[21] Appl. No.: 08/989,278

[22] Filed: Dec. 12, 1997

[51] Int. Cl.[6] .................................................. B60G 21/00
[52] U.S. Cl. ............................ 289/124.13; 280/124.137; 280/124.149
[58] Field of Search ...................... 280/124.13, 124.137, 280/124.149, 124.152

[56] References Cited

U.S. PATENT DOCUMENTS

| | | | |
|---|---|---|---|
| 3,473,821 | 10/1969 | Barenyi et al. | 280/124.13 |
| 3,601,426 | 8/1971 | Hury | 280/124.13 |
| 4,132,431 | 1/1979 | Von Der Ohe | 280/124.137 |
| 4,140,333 | 2/1979 | Thoraval et al. | 280/124.13 |
| 4,143,887 | 3/1979 | Williams et al. | 280/124.149 X |
| 5,263,736 | 11/1993 | Stevens | 280/124.13 X |
| 5,362,094 | 11/1994 | Jensen | 280/124.137 X |

*Primary Examiner*—Christopher P. Ellis
*Attorney, Agent, or Firm*—Tod R. Nissle, P.C.

[57] ABSTRACT

A shock absorber—torsion bar system for the rear of a suspension dragster increases the proportion of sprung to unsprung weight in the dragster and therefore facilitates balancing and stabilizing the dragster to improve performance during a race.

5 Claims, 4 Drawing Sheets

COMBINED SHOCK ABSORBER— TORSION BAR TO INCREASE PROPORTION OF SPRUNG TO UNSPRUNG WEIGHT IN REAR OF SUSPENSION DRAGSTER

BACKGROUND

This invention relates to vehicle suspension and stabilization systems.

More particularly, the invention relates to a shock absorber—torsion bar system for a rear of a suspension dragster, which shock absorber—torsion bar system increases the proportion of sprung to unsprung weight in the dragster and therefore facilitates balancing and stabilizing the dragster to improve performance during a race.

Shock absorbers and torsion bars have long been utilized in racing cars and other offtrack vehicles. Similarly, long sought after goals with respect to a drag racing vehicle include improving the proportion of sprung weight with respect to unsprung weight, reducing the weight of the vehicle, simplifying the mounting of shock absorbers and other components on the frame of the vehicle, and reducing the number of attachment points on the vehicle.

Suspension springs extend between the rear axle housing and the chassis or frame of a suspension drag racing vehicle. The unsprung weight of the race car includes the rear axle or differential housing, the axles extending outwardly from the rear axle housing, and the wheel assemblies (including, tires, tire rims, brakes, wheel spindles) mounted on the axles. The sprung weight includes the vehicle frame. Springs, links, shock absorbers, and a torsion bar interconnect the frame and the rear axle housing. Fifty percent of the weight of the springs, links, shock absorbers and torsion bar is allocated to sprung weight and fifty percent to the unsprung weight. During the "set-up" of a race vehicle, mechanics prefer a greater proportion of unsprung weight because the position and balance of unsprung weight can be altered and adjusted with the suspension springs that extend between the frame and the rear axle housing. In contrast, the tires and other unsprung weight comprise "dead" weight which is not adjustable.

SUMMARY

Accordingly, it would be highly desirable to provide an improved suspension system for a racing vehicle which would increase the proportion of sprung to unsprung weight, would reduce the overall weight of a race vehicle, would simplify the installation of key components of the vehicle, and would reduce the number of points at which components are attached to the frame or to the rear vehicle axle.

Therefore, it is a principal object of the invention to provide an improved racing vehicle.

A further object of the invention is to provide an improved racing vehicle including a suspension—stabilization system which increases the proportion of sprung weight to unsprung weight in the vehicle.

Another object of the invention is to provide an improved racing vehicle in which both the torsion bar and the shock absorbers are attached to the rear axle housing at common pivot points.

Still a further object of the invention is to provide an improved racing vehicles in which the shock absorbers and torsion bar are simultaneously activated.

Yet another object of the invention is to provide an improved racing vehicle in which the size and weight of suspension springs is reduced significantly while the overall weight of the chassis or frame supported by the suspension springs remains about the same.

Yet still a further another object of the invention is to provide an improved racing vehicle shock absorbing system which enables the racing vehicle to better absorb and adjust to small deviations in the road surface over which the racing vehicle is traveling.

These and other, further and more specific objects and advantages of the invention will be apparent to those skilled in the art from the following detailed description thereof, taken in conjunction with the drawings, in which:

DETAILED DESCRIPTION

Figure 1:
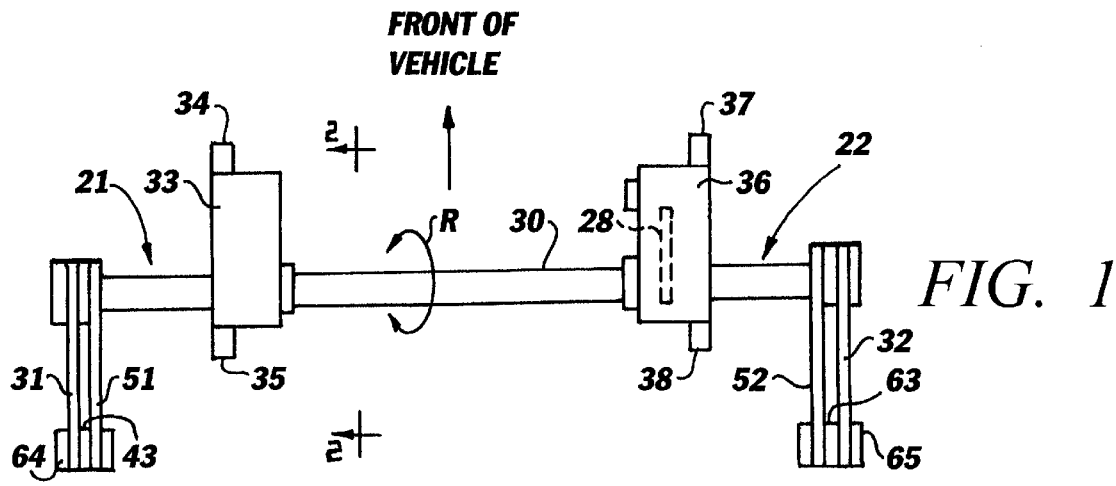
FIG. 1 is a top view illustrating a combination shock absorber—torsion bar system constructed in accordance with the principles of the invention.
Figure 2:
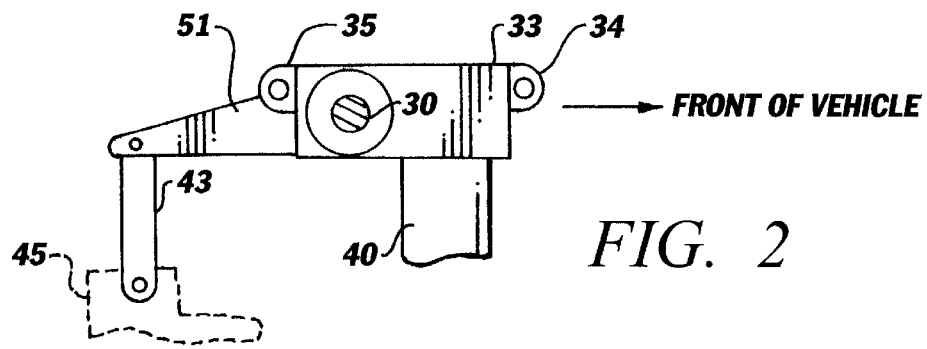
FIG. 2 is a side section view of the shock absorber—torsion bar system of FIG. 1 illustrating additional construction details thereof and taken along section line 2—2 thereof

Briefly, in accordance with my invention, I provide improvements for a racing vehicle. The racing vehicle includes a rear end assembly including a rear end housing, axles extending outwardly from the rear end housing, rear wheels mounted on the axles, and brakes for said rear wheels, includes a frame, and includes spring means extending intermediate the frame and the rear end housing. The improvements increase the proportion of sprung weight with respect to unsprung weight to increase the proportion of the weight of the vehicle adjustable to alter the balance of the race vehicle. The improvements comprise a shock absorber—torsion bar assembly including at least one shock absorber housing fixedly attached only to the frame of the race vehicle; and, a shock absorber mounted in the housing; a torsion bar rotatably mounted on the shock absorber housing and including a pair of ends each pivotally attached to the rear end housing; a shaft extending through the shock absorber housing and pivotally attached to the rear end housing such that displacement of the rear end housing pivots the shaft and actuates the shock absorber.

In another embodiment of the invention, I provide improvements for a racing vehicle. The racing vehicle includes a rear end assembly including a rear end housing, axles extending outwardly from the rear end housing, rear wheels mounted on the axles, and brakes for the rear wheels, includes a frame, and includes spring, means extending intermediate the frame and the rear end housing. The improvements increase the proportion of sprung weight with respect to unsprung weight to increase the proportion of the weight of the vehicle adjustable to alter the balance of the race vehicle. The improvements comprise a shock absorber—torsion bar assembly including at least one shock absorber housing fixedly attached only to the frame of the race vehicle, a shock absorber mounted in the housing; a torsion bar rotatably mounted on the shock absorber housing and including a pair of ends each pivotally attached to the rear end housing; a shaft extending through the shock absorber housing and pivotally attached to the rear end housing such that displacement of the rear end housing simultaneously pivots the shaft and the torsion bar and actuates the shock absorber.

The shock absorber can include a valve which is partially open when the shock absorber is stationary and when the shock absorber is compressed only a short distance; and, which opens further when the shock absorber is compressed a distance less than the short distance.

In still a further embodiment of the invention, I provide improvements for a race vehicle. The race vehicle includes a rear end assembly including a rear end housing, axles extending outwardly from the rear end housing, rear wheels mounted on the axles, and brakes for the rear wheels, and, including a frame. The improvements increase the proportion of sprung weight with respect to unsprung weight to increase the proportion of the weight of the vehicle adjustable to alter the balance of the race vehicle. The improvements comprise a shock absorber—torsion bar assembly including at least one shock absorber housing fixedly attached only to the frame of the race vehicle; a shock absorber mounted in the housing; a torsion bar rotatably mounted on the shock absorber housing and including a pair of ends each pivotally attached to the rear end housing; and, a shaft extending through the shock absorber housing and pivotally attached to the rear end housing such that displacement of the rear end housing pivots the shaft and actuates the shock absorber.

Turning now to the drawings, which depict the presently preferred embodiment of the invention for the purpose of illustrating the practice thereof and not by way of limitation of the scope of the invention, and in which like reference characters refer to corresponding elements throughout the several views. FIG. 1 illustrates a shock absorber—torsion bar assembly constructed in accordance with the principles of the invention and including shock absorber housings 33 and 36 and torsion bar 30 extending through housings 33 and 36. Arms 31 and 51 are attached to one end of the assembly of FIG. 1, and arms 32 and 52 are attached to the other end of the the assembly of FIG. 1. Bolt 64 pivotally secures the distal ends of arms 31 and 51 to link arm 43. Bolt 65 pivotally secures the distal ends of arms 32 and 52 to link arm 63. Link arm 43 is pivotally attached to axle plate 45. Axle plate 45 is fixedly welded to one side of the differential housing (not visible), includes circular opening 66 through which a axle extending from the differential housing passes, and is generally shaped like the state of Utah in the United States of America. Plate 45 is part of the rear axle housing. A sister plate identical in shape and dimension to plate 45 is fixedly welded to the other side of the differential housing and is parallel to and spaced apart from plate 45. Link arm 63 has a shape and dimension identical to that of arm 43 and is pivotally attached to the afore-mentioned sister plate. Housing 33 is provided with a pair of eyelets 34 and 35 for fixedly bolting housing 33 to the frame of a race vehicle in the manner illustrated in FIG. 3. Shock absorber housing 36 is similarly provided with a pair of eyelets 37 and 38 for fixedly bolting housing 36 to the frame of a race vehicle such that housings 33 and 36 are in the spaced apart parallel orientation illustrated in FIGS. 1 and 5. Each housing 33 and 36 encloses a lever arm 28 which, when the arm 28 is pivoted in the manner described below, actuates the piston 29 of its respective shock absorber.

Figure 5:
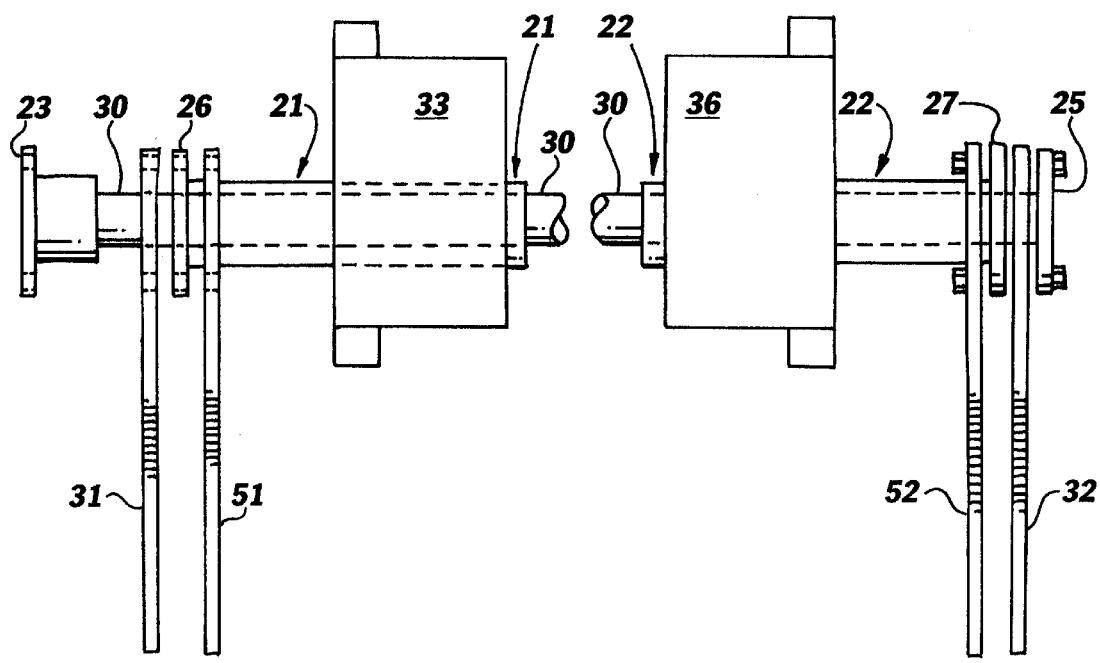
FIG. 5 is an enlarged view of the shock absorber—torsion bar system of FIG. 1 illustrating further construction details thereof; and, FIG. 6 is a left end view of the shock absorber—torsion bar system of FIG. 1 illustrating the activation of a shock absorber.

FIG. 5 further illustrates the hollow cylindrical rocker arms 21 and 22 which pivotally extend through shock absorber housings 33 and 36, respectively. Each arm 21, 22 is pivotally mounted in bushings (not shown) in housings 33 and 36, respectively. Arm 21 includes cylindrical flange 26 with three equally spaced bolt holes drilled therethrough. Arm 22 includes cylindrical flange 27 with three equally spaced bolt holes drilled therethrouoh. Arm 21 is identical in shape and dimension to arm 22. Housing 33 is identical in shape and dimension to housing 36. One end of cylindrical torsion bar 30 is provided with cylindrical flange 23. Flange 23 includes three equally spaced bolt holes drilled therethrough and has a shape and dimension equivalent to that of flanges 26, 25, and 27. The other end of torsion bar 30 is provided with cylindrical flange 25. Flange 25 includes three equally spaced bolt holes drilled therethrough. Torsion arms 31, 32, 51, 52 are each of equivalent shape and dimension. The left hand side of FIG. 5 illustrates flanges 23, 26 and the proximate ends of arms 31 and 51 prior to their being bolted together. The right hand side of FIG. 5 illustrates flanges 25 and 27 and the proximate ends of arms 32 and 52 after the apertures formed therethough have be placed in registration and bolts have been secured through said apertures to sandwich together flanges 25 and 27 and the proximate ends of arms 32 and 52. Flanges 23 and 26 and the proximate ends of arms 31 and 51 are similarly bolted together during the assembly of the shock absorber—torsion bar combination of FIGS. 1 and 5. Arms 31 and 32 are fixedly secured to torsion bar 30. Arms 51 and 52 are fixedly secured to rocker arms 21 and 22, respectively. Bar 30 slidably extends through rocker arms 21 and 22 and, if the distal ends of torsion arms 31, 32, 51, 52 were not pivotally secured to bracket 45 and its sister bracket, arm 31 could be manually grasped and used to rotate torsion bar 30 inside of arms 21 and 22. Since, however, in practice the distal ends of torsion arms 31, 32, 51, 52 are each pivotally attached to bracket 45 (arms 31, 51) and its sister bracket (arms 32, 53) on the other side of the differential housing, rod 30 and rockers arms 21 and 22 all rotate simultaneously in the same direction. Rod 30 and arms 21, 22 can rotate in the directions indicated by arrows R in FIG. 1.

Figure 3:
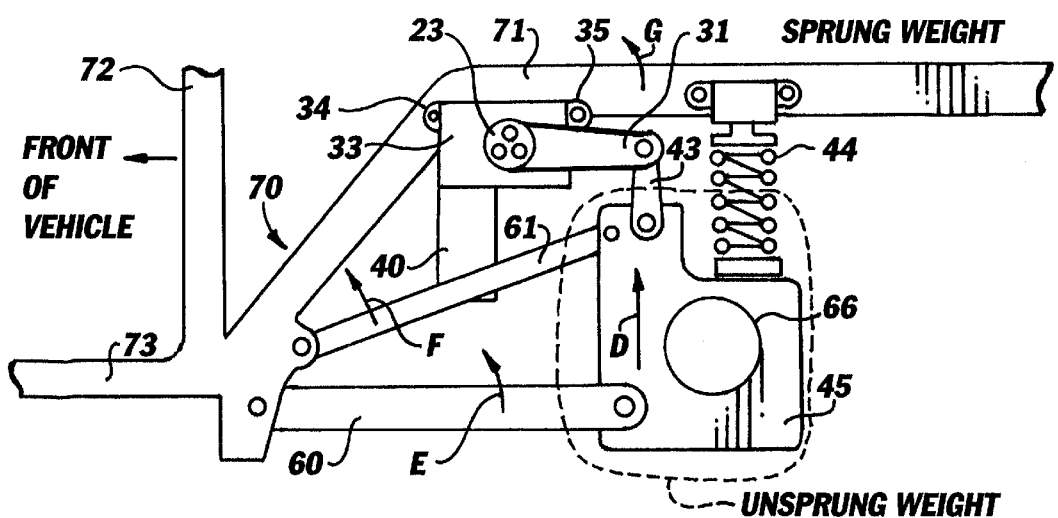
FIG. 3 is a side elevation view of the rear axle and chassis of a racing vehicle with the shock absorber—torsion bar system of FIG. 3 integrated therein.

In FIG. 3, bracket 45 is pivotally connected to the frame by links 60 and 61. One end of each link 60, 61 is pivotally attached to the frame or chassis of a racing vehicle. The other end of each link 60, 61 is pivotally attached to bracket 45. The sister bracket of bracket 45 is similarly pivotally attached to the frame by a pair of links identical to links 60, 61. The frame 70 includes elongate substantially rigid interconnected members 71, 72, 73 and includes other interconnected members which function to form a substantially rigid chassis for a racing vehicle. A car body, motor, seats etc. can be mounted on frame 70 and can comprise part of the sprung weight of a race car.

Figure 4:
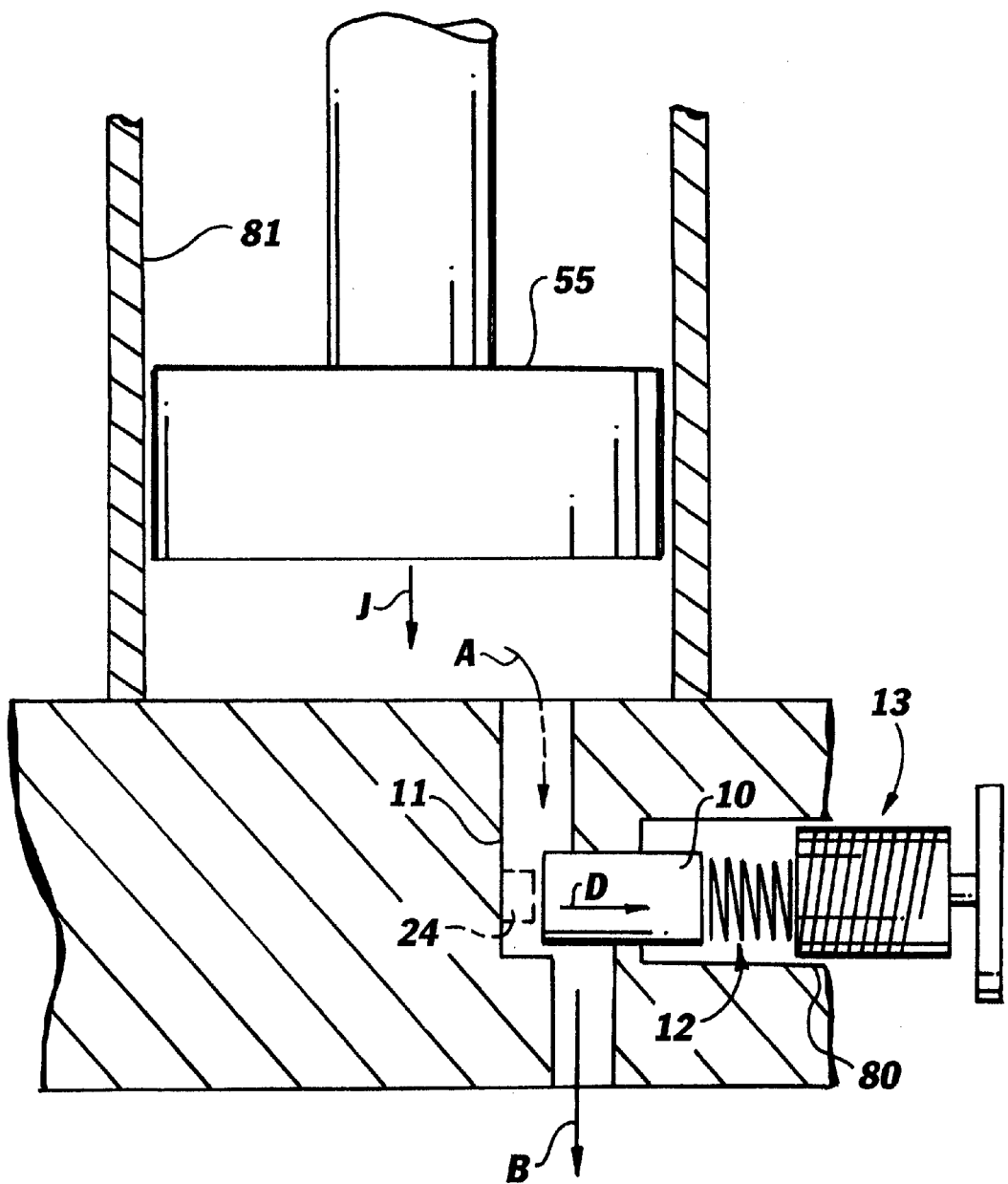
FIG. 4 is a side section view illustrating a portion of a shock absorber utilized in the practice of the invention.
Figure 6:
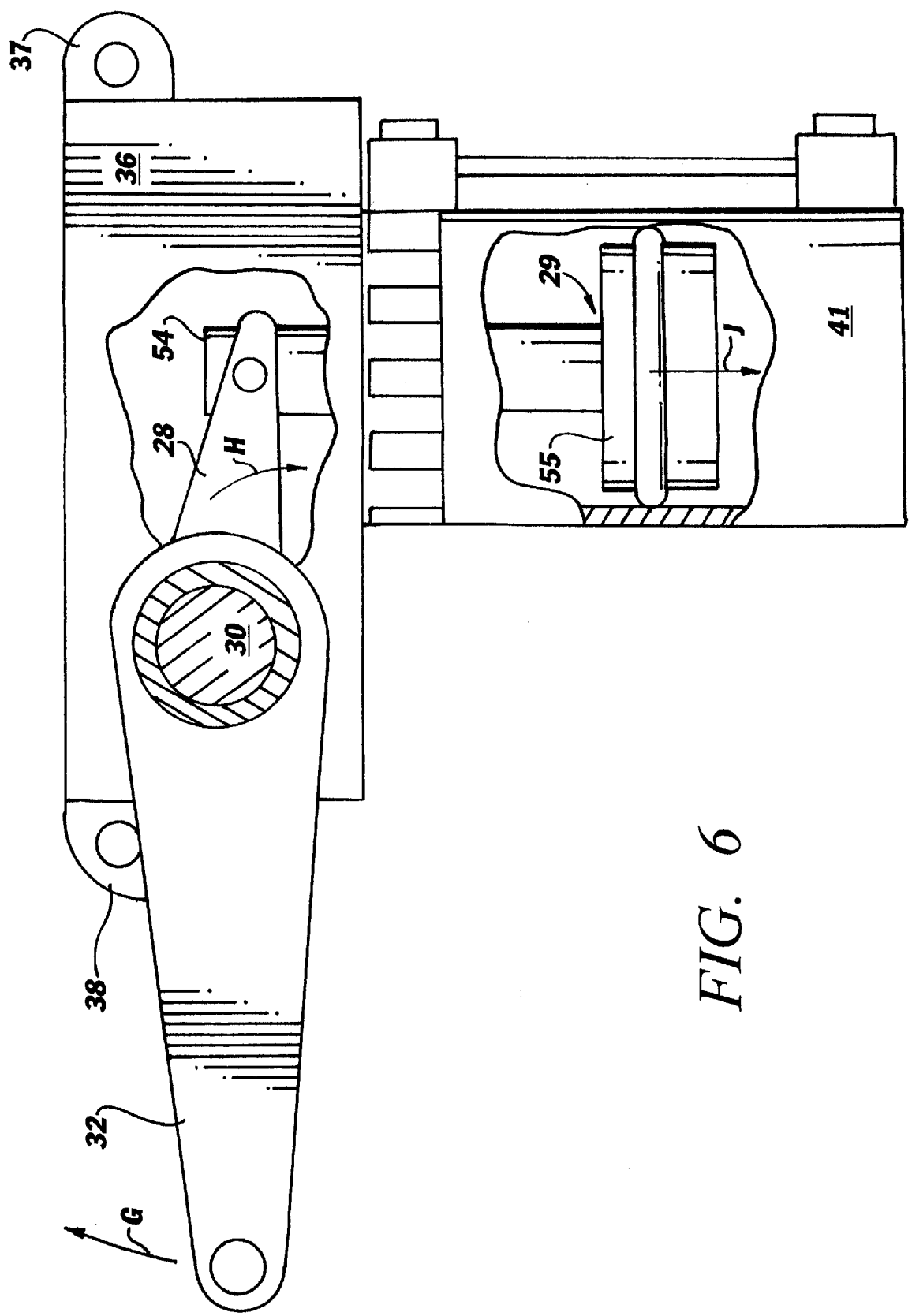

In operation of a "suspension" dragster, when the rear tire adjacent bracket 45 goes over a bump, the rear axle and bracket 45 are upwardly displaced in the direction of arrow D. When bracket 45 is upwardly displaced, links 60 and 61 are displaced and pivot in the directions indicated by arrows E and F, respectively, and torsion arms 31 and 51 (as well as arms 32 and 52) are upwardly displaced in the direction of arrow G (FIG. 3). As illustrated in FIG. 6, when arms 32 are upwardly displaced in the direction G, each link 28 fixedly attached to one of rocker shafts 21 and 22 rotates simultaneously with shaft 21 or 22, as the case may be, and is downwardly displaced in the direction of H. Since the distal end of each link 28 is pivotally attached to the upper end of the shaft 54 of a piston 29 in a shock absorber 40 or 41, downwardly displacing link 28 in the direction of arrow H causes the head 55 and shaft 54 of piston 29 to be downwardly displaced in the direction of arrow J. When piston head 55 moves in the direction of arrow J, oil is forced out through port 11 the direction of arrow A. The oil travels past piston 10 and, at higher pressures (i.e., when the tire activating arm 51 and, consequently, link 28 goes over a large bump) piston 10 is displaced in the direction of arrow D, compressing spring 12 and enlarging the cross sectional area of port 11 to permit more oil to escape. Externally threaded adjuster 13 is turned into internally threaded aperture 80 to compress spring 12 and make it more difficult for piston 10 to be displaced in the direction of arrow D when piston head 55 moves in the direction of arrow J and increases the pressure of fluid flowing through port 11. Threading adjuster 13 out of aperture 80 reduces the pressure required to displace piston 10 in the direction of arrow D. A nub or stop 24 can be including in port 24 to insure that piston 10 can not completely close off port 11. An important feature of the shock absorber of FIG. 4 is that port 24 is never completely closed. This more readily permits movement of piston 55 up (in a direction opposite that of arrow J) or down (in the direction of arrow) J so that shock absorbers 40, 41 can dampen and absorb small deflections of the rear tires as the dragster travels over and on the surface of a race track.

Oil exits port 11 in the direction of arrow B. When the direction of movement of piston head 55 is reversed and head 55 moves in a direction opposite that of arrow J, oil flows through port 11 in directions opposite that of arrows A and B and back into the piston chamber 81.

As would be appreciated by those of skill in the art, when arms 31 and 51 are displaced upwardly in the direction of arrow G (or downwardly in the opposite direction). torsion bar 30 and rocker arms 21 and 22 rotate simultaneously.

One particular advantage of the invention is that mounting shock absorber housings 33 and 36 directly on the frame or chassis of a race car enables the diameter, and therefore the weight, of suspension springs to be reduced. The diameter and weight of suspension spring 44 typically is about fifty percent of the weight of the spring used when the spring is wound around a shock absorber in a conventional fashion. In the presently preferred embodiment of the invention a sister spring of shape and dimension equal to spring 44 extends between the frame and the sister bracket of bracket 45. When the weight of spring 44 is reduced, the proportion of the sprung weight with respect to the unsprung weight increases and, in addition, the overall weight of the race car is reduced. Similarly, the shocker absorber—torsion bar assembly of the invention typically reduces the weight of each shock absorber, as well as reducing the number of connection points required. Instead of requiring that each shock absorber and the torsion bar be connected to the frame, only the shock absorber housings 33. 36 need to be secured to the substantially rigid frame of a race car. The shock absorber housings support torsion bar 30 instead of using the race ear frame to support the torsion bar 30.

Having described the presently preferred embodiments of the invention and the manner of their use so such can be understood by those of skill in the art, I claim:

1. In combination with a dragster including
   a rear end assembly including a rear end housing, axles extending outwardly from the rear end housing, rear wheels mounted on said axles, and brakes for said rear wheels,
   a frame,
   spring means extending intermediate the frame and the rear end housing,
   the improvements to increase the proportion of sprung weight with respect to unsprung weight to increase the proportion of the weight of the vehicle adjustable to alter the balance of the dragster, said improvements comprising a shock absorber—torsion bar assembly including
   (a) at east one shock absorber housing fixedly attached only to the frame of the dragster;
   (b) a shock absorber mounted in said housing;
   (c) a torsion bar rotatably mounted on said shock absorber housing and including a pair of ends each pivotally attached to the rear end housing;
   (d) a shaft extending through said shock absorber housing and pivotally attached to the rear end housing such that displacement of the rear end housing pivots said shaft and actuates said shock absorber.

2. In combination with a dragster including
   a rear end assembly including a rear end housing, axles extending outwardly from the rear end housing, rear wheels mounted on said axles, and brakes for said rear wheels,
   a frame,
   spring means extending intermediate the frame and the rear end housing,
   the improvements to increase the proportion of sprung weight with respect to unsprung weight to increase the proportion of the weight of the vehicle adjustable to alter the balance of the dragster, said improvements comprising a shock absorber—torsion bar assembly including
   (a) at least one shock absorber housing fixedly attached only to the frame of the dragster;
   (b) a shock absorber mounted in said housing;
   (c) a torsion bar rotatably mounted on said shock absorber housing and including a pair of ends each pivotally attached to the rear end housing;
   (d) a shaft extending through said shock absorber housing and pivotally attached to the rear end housing such that displacement of the rear end housing simultaneously pivots said shaft and said torsion bar and actuates said shock absorber.

3. The improvements of claim 1 wherein said shock absorber includes a valve which is
   (a) partially open when the shock absorber is stationary and when the shock absorber is compressed only a short distance; and,
   (b) opened further when the shock absorber is compressed a distance less than said short distance.

4. The improvements of claim 2 wherein said shock absorber includes a valve which is
   (a) partially open when the shock absorber is stationary and when the shock absorber is compressed only a short distance; and,
   (b) opened further when the shock absorber is compressed a distance less than said short distance.

5. In combination with a dragster including a rear end assembly including a rear end housing, axles extending outwardly from the rear end housing, rear wheels mounted on said axles, and brakes for said rear wheels, and a frame, the improvements to increase the proportion of sprung weight with respect to unsprung weight to increase the proportion of the weight of the vehicle adjustable to alter the balance of the dragster, said improvements comprising a shock absorber—torsion bar assembly including (a) at least one shock absorber housing fixedly attached only to the frame of the dragster;
(b) a shock absorber mounted in said housing;
(c) a torsion bar rotatably mounted on said shock absorber housing and including a pair of ends each pivotally attached to the rear end housing;
(d) a shaft extending through said shock absorber housing and pivotally attached to the rear end housing such that displacement of the rear end housing pivots said shaft and actuates said shock absorber.

* * * * *